United States Patent
Boehme et al.

(10) Patent No.: US 9,923,342 B2
(45) Date of Patent: Mar. 20, 2018

(54) BASE CORNER PIECE FOR SINGLE-HANDED MOUNTING ON A SWITCH CABINET

(71) Applicant: RITTAL GMBH & CO. KG, Herborn (DE)

(72) Inventors: Siegfried Boehme, Wolfen (DE); Heiko Holighaus, Eschenburg (DE); Lars Holkenbrink, Osnabrueck (DE)

(73) Assignee: Rittal GmbH & Co. KG, Herborn (DE)

( * ) Notice: Subject to any disclaimer, the term of this patent is extended or adjusted under 35 U.S.C. 154(b) by 767 days.

(21) Appl. No.: 13/261,919

(22) PCT Filed: Jan. 11, 2013

(86) PCT No.: PCT/DE2013/000013
§ 371 (c)(1),
(2) Date: Jun. 16, 2014

(87) PCT Pub. No.: WO2013/107437
PCT Pub. Date: Jul. 25, 2013

(65) Prior Publication Data
US 2014/0348583 A1    Nov. 27, 2014

(30) Foreign Application Priority Data
Jan. 20, 2012    (DE) .................. 10 2012 001 097

(51) Int. Cl.
*H02B 1/30*    (2006.01)
*F16B 21/04*    (2006.01)

(52) U.S. Cl.
CPC .............. *H02B 1/303* (2013.01); *F16B 21/04* (2013.01); *Y10T 403/4602* (2015.01); *Y10T 403/73* (2015.01)

(58) Field of Classification Search
CPC ........ H02B 1/012; H02B 1/013; H02B 1/014; H02B 1/30; Y10T 403/42;
(Continued)

(56) References Cited

U.S. PATENT DOCUMENTS 5,076,736 A * 12/1991 Grewe ................. A47G 1/0605
403/205
5,624,160 A *  4/1997 Koch .................... B64D 11/06
297/440.16
(Continued)

FOREIGN PATENT DOCUMENTS

DE    19536950 C1    11/1996
DE    19615144 A1    10/1997
(Continued)

Primary Examiner — Jonathan Masinick
(74) Attorney, Agent, or Firm — Marshall & Melhorn, LLC

(57) ABSTRACT

The invention relates to a base corner piece for single-handed mounting on a switch cabinet, comprising a supporting portion that can be screwed to a frame profile of the switch cabinet in a mounted position of the base corner piece, and is characterized in that the base corner piece has means for pre-mounting of the base corner piece on the frame profile in the mounted position, comprising means for spatial orientation of the base corner piece in relation to the frame profile and means for releasable latching of the base corner piece to the frame profile.

3 Claims, 11 Drawing Sheets

(58) Field of Classification Search
CPC ......... Y10T 403/4602; Y10T 403/7005; Y10T 403/7007; F16B 21/04
See application file for complete search history.

(56) References Cited

U.S. PATENT DOCUMENTS

| | | | |
|---|---|---|---|
| 5,655,821 A | 8/1997 | Laboch et al. | |
| 5,735,068 A * | 4/1998 | Houssian | A47G 1/10 40/782 |
| 5,992,646 A | 11/1999 | Benner et al. | |
| 6,102,498 A | 8/2000 | Koehler et al. | |
| 6,164,737 A | 12/2000 | Benner et al. | |
| 6,254,303 B1 * | 7/2001 | Falat | B23B 31/113 403/321 |
| 6,261,042 B1 * | 7/2001 | Pratt | F16B 5/10 411/551 |
| 6,315,132 B1 * | 11/2001 | Hartel | H02B 1/301 211/189 |
| 6,796,623 B1 | 9/2004 | Fontana et al. | |
| 7,364,243 B2 | 4/2008 | Wyatt et al. | |
| 8,292,093 B2 * | 10/2012 | Fan | H05K 7/1488 211/26 |
| 9,271,424 B2 * | 2/2016 | Broemstrup | H02B 1/303 |
| 2003/0214205 A1 | 11/2003 | Wyatt et al. | |
| 2005/0079010 A1 * | 4/2005 | Droppleman | F16B 21/04 403/348 |
| 2007/0092330 A1 * | 4/2007 | Zeilinger | F16B 7/18 403/231 |
| 2009/0001863 A1 | 1/2009 | Wyatt et al. | |

FOREIGN PATENT DOCUMENTS

| | | | |
|---|---|---|---|
| DE | 19647723 C1 | 4/1998 | |
| DE | 19647790 A1 | 5/1998 | |
| DE | 69604603 T2 | 5/2000 | |
| DE | 202004016850 U1 | 1/2005 | |
| DE | 102010016722 A1 | 11/2011 | |
| DE | 102010035789 A1 * | 3/2012 | ............... H02B 1/01 |
| DE | 102010035792 A1 * | 3/2012 | ............... H02B 1/01 |
| EP | 1460341 A2 * | 9/2004 | ........... A47B 47/005 |
| EP | 1229620 B1 | 7/2007 | |
| FR | 2546361 A1 | 11/1984 | |
| FR | 2896632 A1 | 7/2007 | |
| WO | 2007020612 A1 | 2/2007 | |
| WO | WO 2012113551 A1 * | 8/2012 | ............... H02B 1/28 |

* cited by examiner

BASE CORNER PIECE FOR SINGLE-HANDED MOUNTING ON A SWITCH CABINET

BACKGROUND OF THE INVENTION

The invention relates to a base corner piece for single-handed mounting on a switch cabinet, comprising a supporting portion that can be screwed to a frame profile of the switch cabinet in a mounted position of the base corner piece. A base corner piece of that type is known from DE 696 04 603 T2.

In a switch cabinet of rectangular floor area, the base of the switch cabinet is often built up by base corner pieces arranged at each of the bottom corners of the switch cabinet, the corner pieces commonly made of steel and screwed to the frame profile of the switch cabinet. For aesthetic reasons, or in order to avoid that objects get under the switch cabinet, covers can be fixed between the base corner pieces.

Base corner pieces as known have the disadvantage that supporting surfaces of frame profile and base corner piece are flat and that there is in particular no form-fit of these surfaces which would allow re-alignment of the base corner piece with respect to the switch cabinet for the purpose of screwing the base corner piece to the frame profile. In particular for fixing the covers described above, however, it is indispensable that the base corner pieces are precisely aligned with reference to the frame profile of the switch cabinet. DE 10 2010 016 722 A1 shows a base of a switch cabinet, where bottom corner elements may be snapped on. DE 196 15 144 A1 discloses a base to be snapped on.

SUMMARY OF THE INVENTION

It is the object of the invention to provide a base corner piece of the generic type which facilitates a precisely aligned screwing of the base corner piece with the frame profile.

According to the invention, this object is solved by a base corner piece as defined in claim 1. Preferred embodiments of the invention are subject matter of subclaims 2 to 10.

The base corner piece according to the invention is characterized in that it has means for pre-mounting of the base corner piece on the frame profile in the mounted position, comprising means for spatial orientation of the base corner piece in relation to the frame profile and means for releasable latching of the base corner piece to the frame profile.

Consequently, the object on which the invention is based is solved in that the pre-alignment of the base corner piece with respect to the frame profile, which is necessary for precisely aligned screwing of the base corner piece to the frame profile, is provided with the aid of separate means distinct from the screwing means. So it is possible that, independent of screwing the base corner piece to the switch cabinet and prior to this step, the base corner piece may be aligned with reference to the frame profile. Then, screwing of the base corner piece to the frame profile has merely the function to produce a permanent form-fit connection between the base corner piece and the frame profile. Alignment of the base corner piece with reference to the switch cabinet simultaneously with screwing, as always required by base corner pieces known from the prior art, is no longer necessary when using base corner pieces according to the invention.

In an embodiment of the invention, the means for spatial orientation comprise a first and a second set of first and second abutment sides which are respectively perpendicular to each other, wherein in a mounting position a respective one of sides of the first set abuts at one of two outer sides of the frame profile and a respective one of sides of the second set abuts at one of two inner sides of the frame profile in a form-fitting manner. That embodiment is in particular suitable for mounting the base corner piece to a frame profile which comprises, further to a supporting side in contact with the supporting portion, two parallel side elements which are respectively perpendicular to the supporting side.

In another embodiment of the invention it is provided that the means for releasable latching comprise at least one latch which in a mounting position is latched in an undercut receptacle of the frame profile, where the receptacle is preferably formed in an inner side of the frame profile. Preferably, the undercut receptacle is formed by a system perforation which is anyway provided in the frame profile. If the frame profile, as usual, is formed as a hollow profile, the undercut is formed by the inner wall surface of the frame profile.

In addition to the latches or independent thereof, it may, in a further embodiment of the invention, also be provided that the means for spatial orientation comprise at least two guide pins, wherein in the mounting position at least one of the guide pins is received in a system perforation of a first profile side of the frame profile and at least one of the guide pins is received in a system perforation of a second profile side of the frame profile bent with respect to the first profile's side, in a form-fitting manner. Accordingly, in a switch cabinet with rectangular floor area, respectively two pairs of parallel profile elements are provided, wherein adjoining profile elements are perpendicular to one another, so that in the embodiment above at least one of the guide pins is received in the system perforation of a first profile side and at least one of the guide pins is received in a system perforation of a profile side perpendicular to the first profile side, in a form-fitting manner. In place of system perforations, holes or openings in the profile sides, specifically formed for the guide pins, may be provided.

Another embodiment of the invention provides that the means for releasable latching the base corner piece with the frame profile include at least one permanent magnet which is mounted in the supporting portion of the base corner piece. For tolerance compensation, the permanent magnet can be floating supported.

According to the invention, the means for spatial orientation and/or the means for releasable latching may include a bayonet joint. This bayonet joint, in turn, may comprise a plurality of bayonet hooks arranged on a common circular path, the bayonet hooks respectively comprising a cylindrical guide surface for form-fit abutment at a rim surface of a bayonet hook receiver of the frame profile and, adjoined thereto, a free end extending beyond the guide surface in radial direction. It is preferred that the bayonet hooks are concentrically arranged around a threaded seat for screwing the supporting portion to the frame profile. This offers production advantages in that the treaded seat can be formed integrally with the bayonet hooks and be inserted into the base corner piece. Preferably, the threaded seat is a sleeve inserted into the base corner piece, the bayonet hooks being integral with the threaded seat at an end thereof which is associated with the supporting portion. The bayonet hooks can be screwed, riveted of welded to the end of the sleeve which is associated with the supporting portion.

In another embodiment of the invention, it is provided that the base corner piece comprises a turning protection element having a first and a second supporting surface, wherein in the mounting position of the base corner piece the first supporting surface abuts at a first one of two perpendicular inner sides of the frame profile and the second supporting surface abuts at a second one of the two perpendicular inner sides of the frame profile. If the base of the switch cabinet is assembled from perpendicular frame profiles, as usual, and thus comprises a rectangular floor area, the turning protection element may be formed substantially square or rectangular. In order to achieve a lever action greatest possible, however, the supporting surfaces may also be formed at the free ends of a first or a second, respectively, leg of the turning protection element. The turning protection element can be formed integrally with the base corner piece or as a separate component, optionally combinable with the base corner piece, for example, to be latched. For adjustment of the turning protection element, in particular for adjusting the arrangement of the first and the second supporting surfaces, it may be provided in an embodiment that the turning protection element comprises predetermined breaking points to adjust the turning protection element to the geometry of the respective frame profile of the switch cabinet according to need. If the supporting surfaces of the turning protection element, as described above, are arranged at the free ends of a first and a second leg of the turning protection element, the predetermined breaking points can be used to adjust the length of the legs and accordingly the position of the free end of the legs where the supporting surface is provided.

BRIEF DESCRIPTION OF THE DRAWINGS

Further details of the invention are explained with the aid of the figures below. It is shown in.

DETAILED DESCRIPTION OF THE INVENTION

Figure 1:
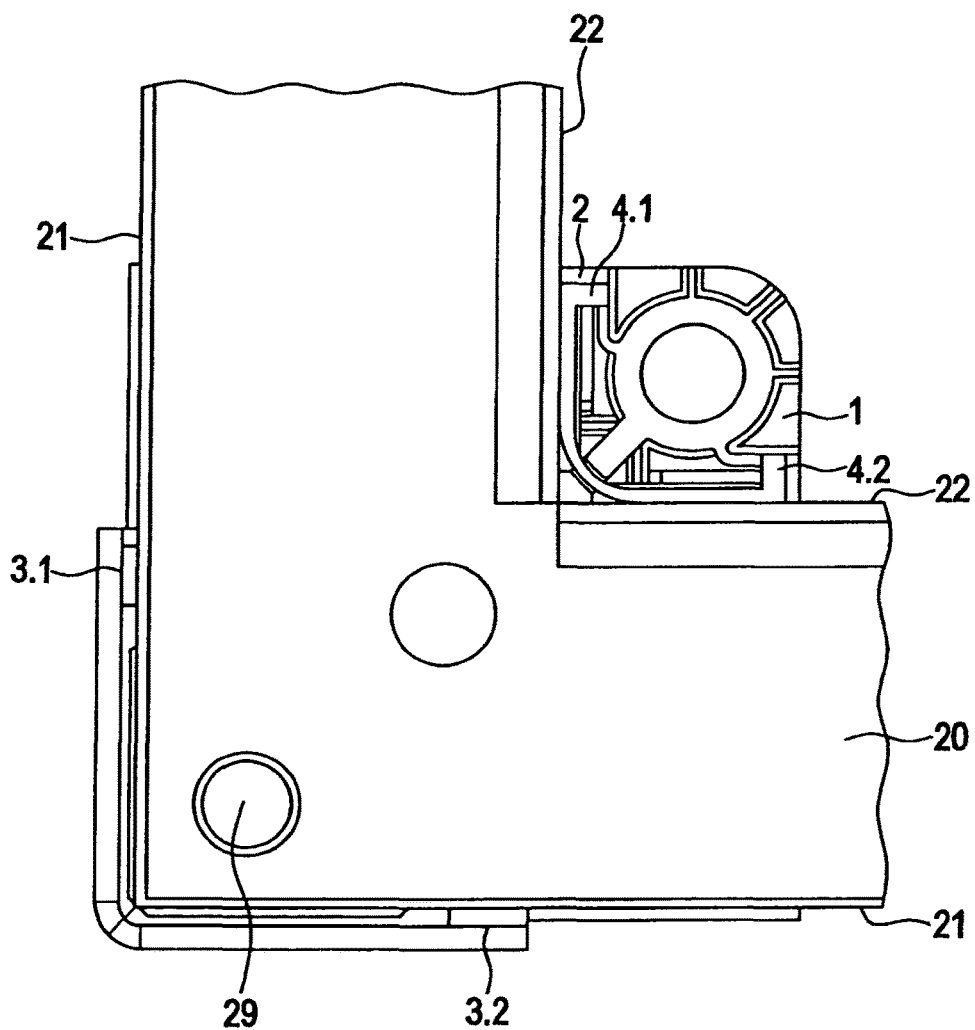
FIG. 1 a first embodiment of the base corner piece according to the invention with frame profile corner mounted thereto.

FIG. 1 illustrates a first embodiment of the base corner piece 1 according to the invention with frame profile 20 mounted thereto in a top view. In the illustrated embodiment, the means for spatial orientation of the base corner piece 1 with reference to the frame profile 20 comprise a first set of first and second abutment sides 3.1, 3.2 perpendicular to each other and a second set of first and second abutment sides 4.1, 4.2 perpendicular to each other. Sides 3.1 and 3.2 of the first set abut at an outer side 21 of frame profile 20, and sides 4.1 and 4.2 abut at an inner side 22 of frame profile 20 in a form-fitting manner. By inserting frame profile 20 into the receptacle formed by sides 3.1, 3.2, 4.1, 4.2, frame profile 20 is positioned with respect to base corner piece 1 in a predetermined manner. Frame profile 20 assumes a position in which bolt seat 29 is aligned with a respective threaded seat of base corner piece 1 or a corresponding bolt hole of base corner piece 1, so that a bolt can be inserted through the aligned seats for screwing base corner piece 1 with frame profile 20. Sides 4.1 and 4.2 are integrally formed. For releasable latching base corner piece 1 to frame profile 20, sides 3.1, 3.2, 4.1, 4.2 may be made of an elastic material to produce a clamping joint between frame profile 20 and base corner piece 1 when frame profile 20 is inserted into the receptacle formed on supporting portion 2 between sides 3.1, 3.2, 4.1, 4.2.

Figure 2:
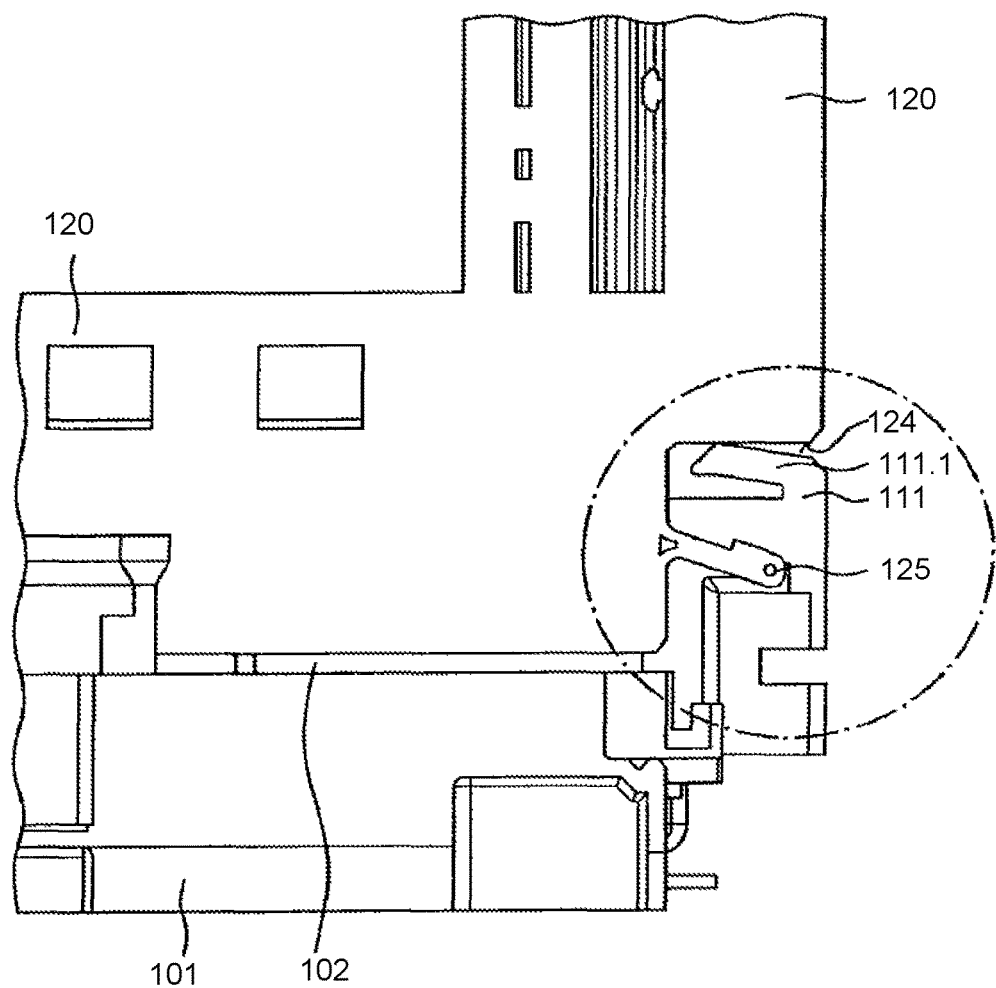
FIG. 2 a second embodiment of the base corner piece according to the invention with frame profile corner mounted thereto.

In the embodiment illustrated in FIG. 2, base corner piece 101 is provided for mounting to a frame profile 120, as it is known from DE 196 47 723 C1, DE 195 36 950 C1 and DE 196 47 790 C2. Here, the means for releasable latching base corner piece 101 to frame profile 120 is formed as a clamping element 111 which in latched in the receptacle formed between the lower end of vertical frame profile 120 and rain gutter 125 of horizontal frame profile 120. Clamping element 111 comprises a flexible support element 111.1 supporting at the lower end face 124 of the vertical frame profile. It may be recognized how horizontal frame profile 120 supports on supporting portion 102 of base corner piece 101.

Figure 3A:
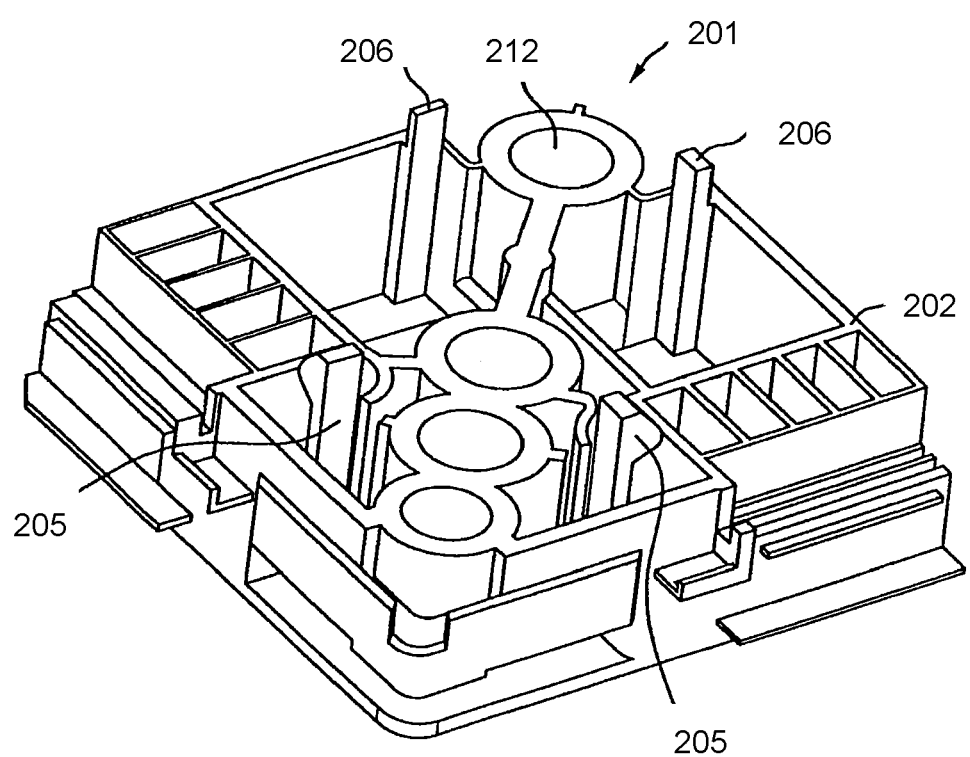
FIGS. 3a and 3b a perspective view of the supporting section of a third embodiment of the base corner piece according to the invention and of a corresponding frame profile corner.
Figure 3B:
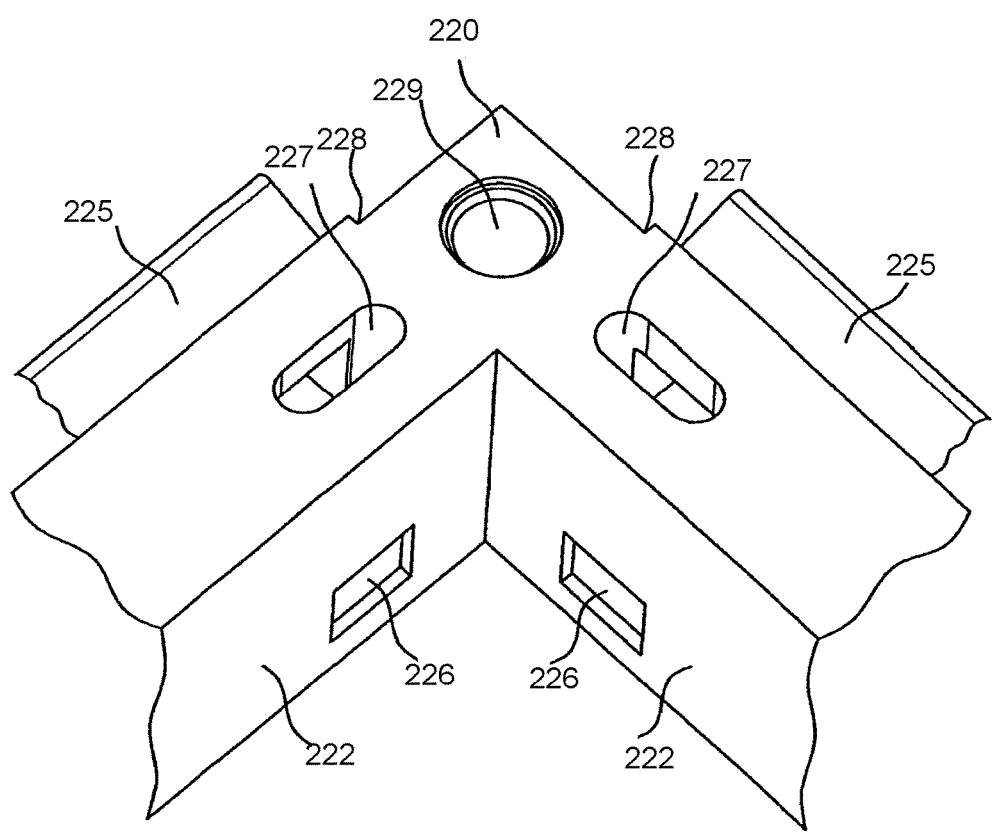

In the embodiment illustrated in FIGS. 3a and 3b of a base corner piece 201 according to the invention, the means for releasable latching comprise two latches 205 which are, in a mounting position, latched in an undercut receptacle 226 of frame profile 220. The receptacles 226 are formed on the inner side 222 of frame profile 220. For spatial orientation, two guide pins 206 are further provided at base corner piece 201 which extend from supporting portion 202, guide pins 206 being arranged such that they engage, in the mounting position, in a perforation 227 in the profile side of frame profile 220 facing toward supporting portion 202, wherein at least one of the guide pins 206 is received in a perforation 227 of a first profile side of frame profile 220 and at least one of guiding pins 206 is received in a perforation 227 of a second profile side bent by 90° with respect to the first profile side, in a form-fitting manner. Instead, guide pins 206 may be also be abut at edges 228 which are formed at the outer side of a frame profile 220 opposite inner side 222, in the mounting position of base corner piece 201, the edges 228 in turn are formed at different profile sides of frame profile 220 extending offset by 90°. The means for spatial orientation of the base corner piece 201 with reference to frame profile 220 and the means for releasable latching base corner piece 201 to frame profile 220 are respectively aligned to each other and with reference to frame profile 220, that in the mounting position hole 212 of base corner piece 201 is aligned with bolt seat 229 of frame profile 220 for the purpose of guiding a bolt for screwing base corner piece 201 with frame profile 220.

Figure 4:
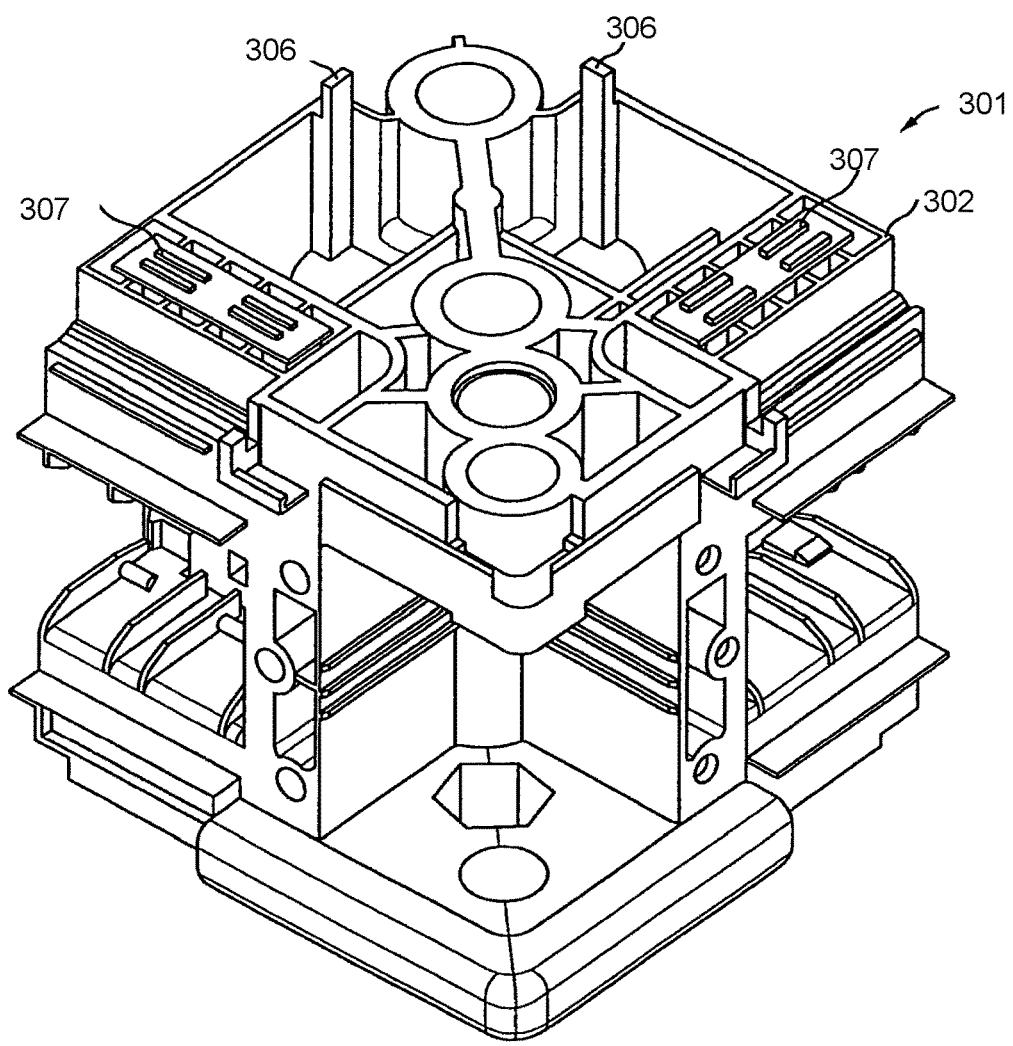
FIG. 4 a perspective view of a fourth embodiment of the base corner piece according to the invention.

In the embodiment illustrated in FIG. 4, again, the means for spatial orientation of base corner piece 301 with reference to frame profile 320 are formed as two guide pins 306 which, in analog to the embodiment according to FIGS. 3a and 3b may be received in respective system perforations 327 or may be abutted at edges 328 of frame profile 320. The means for releasable latching base corner piece 301 to frame profile 320 are permanent magnets 307 which are inserted into supporting portion 302 of base corner piece 301. Latching of base corner piece 301 to frame profile 320 achievable with the aid of permanent magnets 307 during pre-mounting base corner piece 301 to frame profile 320 results in a sufficiently form-fit connection between this components for final screwing base corner piece 301 to frame profile 320. In order to optimize form-fit between base corner piece 301 and frame profile 320, permanent magnets 307 can be floating supported.

Figure 5A:
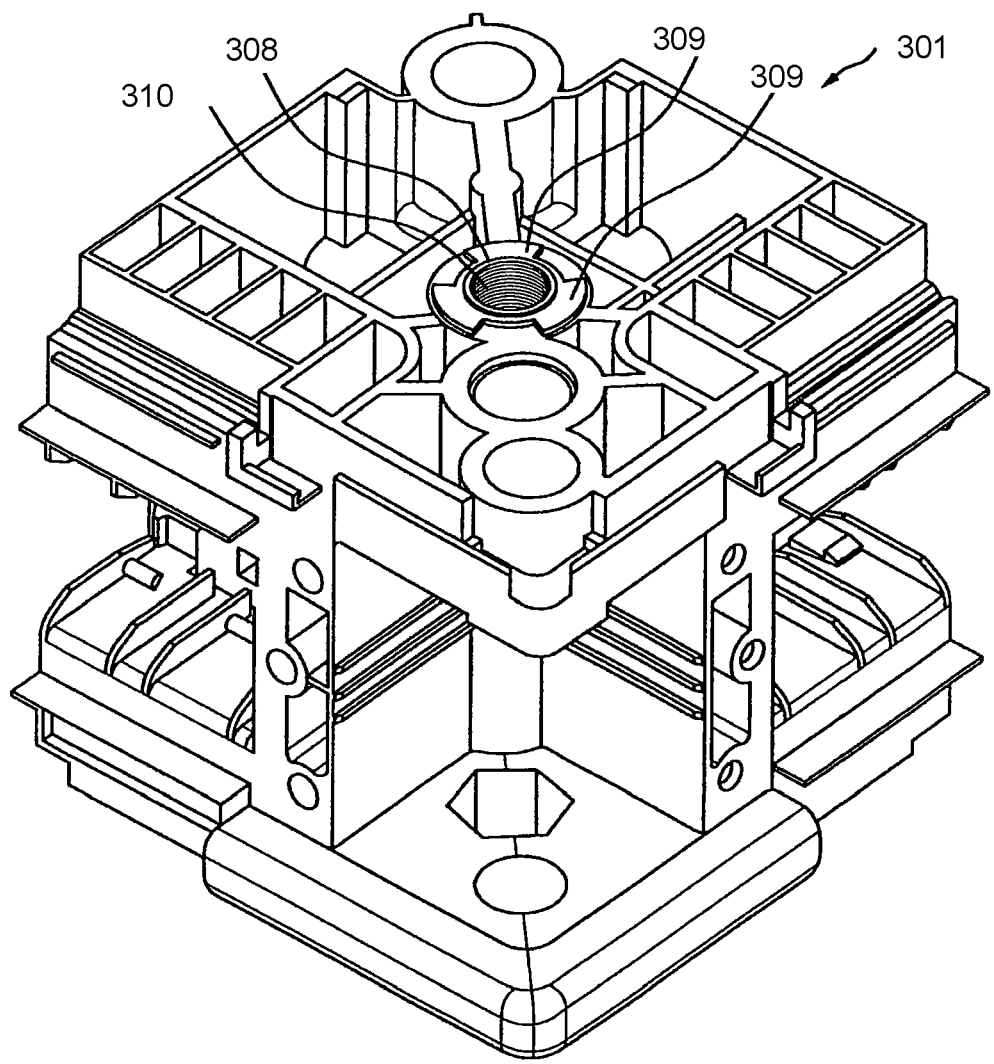
FIGS. 5a and 5b a perspective view of a fifth embodiment of the base corner piece according to the invention and of a respective frame profile corner.
Figure 5B:
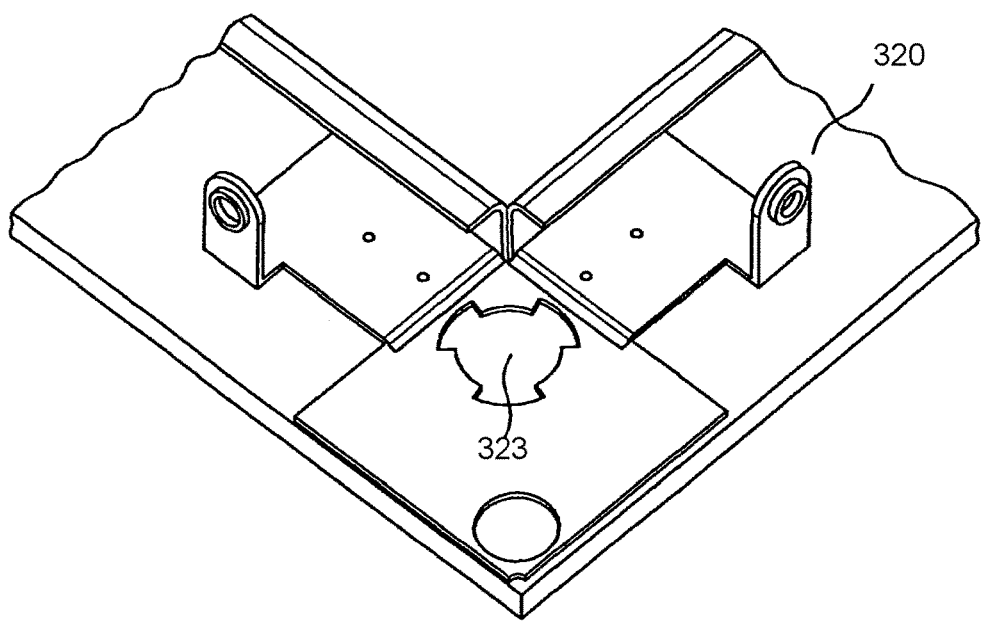

In the base corner piece 301 according to FIG. 5a, the means for spatial orientation and/or the means for releasable latching are formed as bayonet joint 308 comprising bayonet hooks 309. A precise spatial orientation of base corner piece 301 with reference to frame profile 320 may be achieved in that bayonet joint 308 or bayonet hooks 309, respectively, comprise a stopper which defines in a turning direction of bayonet joint 308 an end position corresponding to the mounting position of base corner piece 301. At the side facing toward supporting portion 302, frame profile 320 comprises a bayonet hook receiver 323 into which bayonet joint 308 of base corner piece 301 can be inserted, and base corner piece 301 may be rotated with respect thereto. Bayonet hooks 309 are concentrically arranged around a threaded seat 310 for screwing supporting portion to frame profile 320. Preferably, bayonet hooks 309 are designed such that they are pressed against the rim of bayonet hook receiver when screwing supporting portion 302 to frame profile 320, so that a form-fit connection is produced between frame profile 320 and base corner piece 301.

Figure 6:
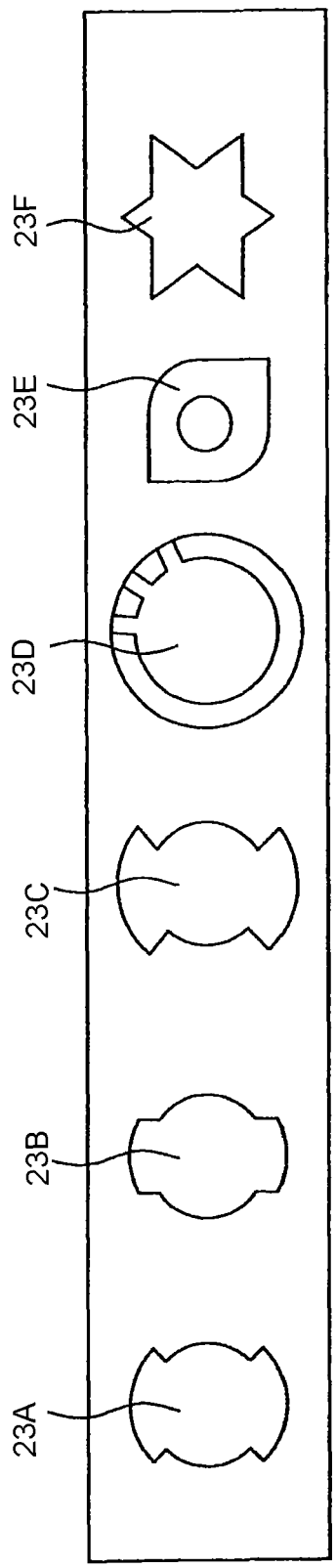
FIG. 6 six exemplary embodiments of bayonet hook receivers according to the invention.

FIG. 6 illustrates exemplary embodiments of bayonet hook receivers 23A, 23B, 23C, 23D, 23E and 23F according to the invention.

Figure 7A:
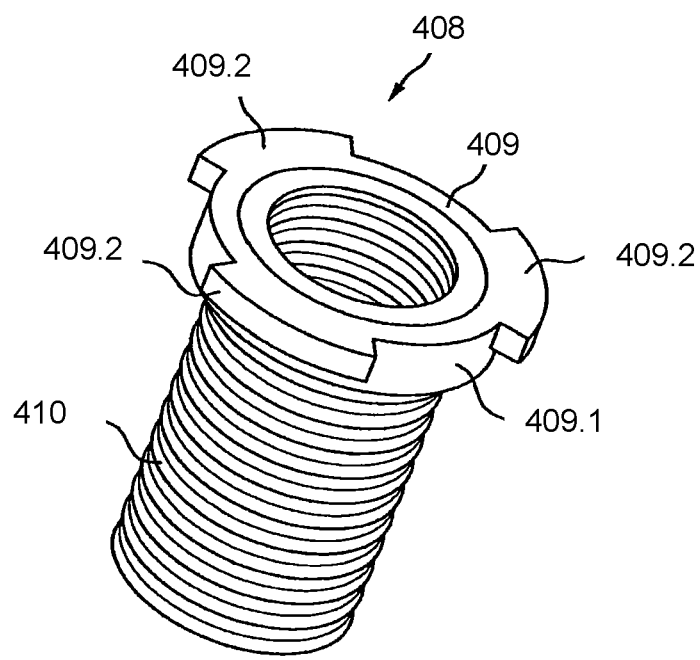
FIGS. 7a-7c three embodiments of bayonet hooks integrally formed with a threaded seat.

FIG. 7a illustrates an exemplary embodiment of bayonet hook 409 integrally formed with a threaded seat 410. Threaded seat 410 is formed as a sleeve which can be inserted into base corner piece 401 by producing a form-fit connection between base corner piece 401 and the sleeve. Base corner piece 401 of the generic type are preferably made of a plastic material, while threaded seat 410 is preferably made of metal. It is conceivable that sleeve 410 is molded into base corner piece 401. For this purpose, threaded seat 410 preferably comprises a profile at its outer side in order to improve form- and force-fit between threaded seat 410 and base corner piece 401.

Bayonet joints 408 comprise three bayonet hooks 409 arranged on a common circular path, bayonet hooks 409 respectively having a cylindrical guide surface 409.1 for form-fit abutment at a rim surface 424 of a bayonet hook receiver 423 of frame profile 420, so that bayonet joint 408 may be rotated within bayonet hook receiver 423. Each of bayonet hooks 409 comprises, connected to the cylindrical guide surface 409.1, a free end 409.2 extending beyond guide surface 409.1 in radial direction, which in the mounting position of the base corner piece 401 extends the rim portion for producing the releasable latch of the base corner piece to the frame profile. In the embodiment according to FIG. 7a, bayonet joint 408 is screwed to the outer side of an end of threaded seat 410.

Figure 7B:
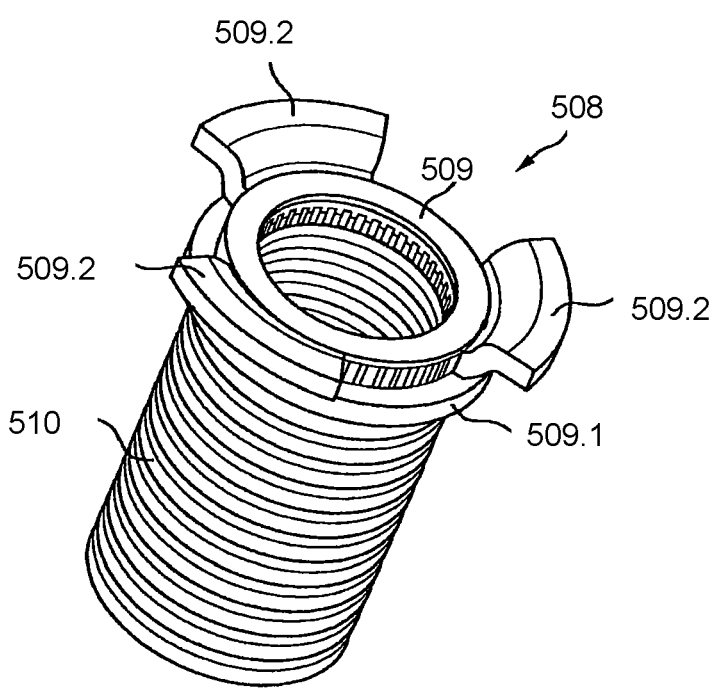

FIG. 7b illustrates another exemplary embodiment of bayonet hook 509 integrally formed with a threaded seat 510. Threaded seat 510 is formed as a sleeve which can be inserted into base corner piece 501 by producing a form-fit connection between base corner piece 501 and the sleeve. Base corner piece 501 of the generic type are preferably made of a plastic material, while threaded seat 510 is preferably made of metal. It is conceivable that sleeve 510 is molded into base corner piece 501. For this purpose, threaded seat 510 preferably comprises a profile at its outer side in order to improve form- and force-fit between threaded seat 510 and base corner piece 501.

Bayonet joints 508 comprise three bayonet hooks 509 arranged on a common circular path, bayonet hooks 509 respectively having a cylindrical guide surface 509.1 for form-fit abutment at a rim surface 524 of a bayonet hook receiver 523 of frame profile 520, so that bayonet joint 508 may be rotated within bayonet hook receiver 523. Each of bayonet hooks 509 comprises, connected to the cylindrical guide surface 509.1, a free end 509.2 extending beyond guide surface 509.1 in radial direction, which in the mounting position of the base corner piece 501 extends the rim portion for producing the releasable latch of the base corner piece to the frame profile. In the embodiment according to FIG. 7b, bayonet joint 508 is riveted to the free end of threaded seat 510.

Figure 7C:
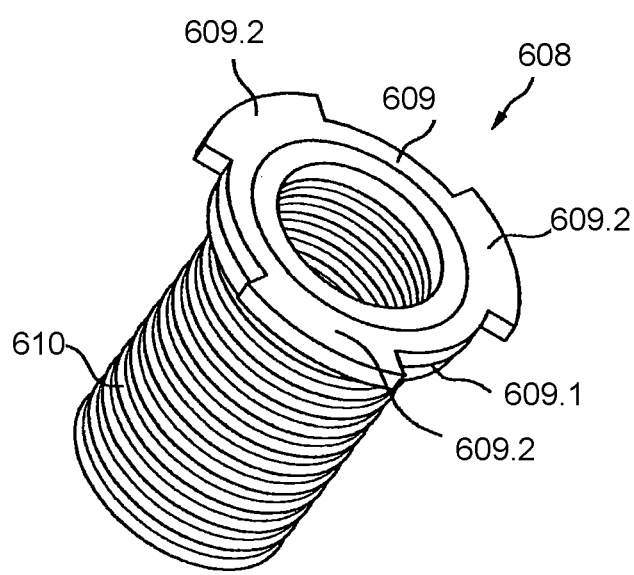

FIG. 7c illustrates yet another exemplary embodiment of bayonet hook 609 integrally formed with a threaded seat 610. Threaded seat 610 is formed as a sleeve which can be inserted into base corner piece 601 by producing a form-fit connection between base corner piece 601 and the sleeve. Base corner piece 601 of the generic type are preferably made of a plastic material, while threaded seat 610 is preferably made of metal. It is conceivable that sleeve 610 is molded into base corner piece 601. For this purpose, threaded seat 610 preferably comprises a profile at its outer side in order to improve form- and force-fit between threaded seat 610 and base corner piece 601.

Bayonet joints 608 comprise three bayonet hooks 609 arranged on a common circular path, bayonet hooks 609 respectively having a cylindrical guide surface 609.1 for form-fit abutment at a rim surface 624 of a bayonet hook receiver 623 of frame profile 620, so that bayonet joint 608 may be rotated within bayonet hook receiver 623. Each of bayonet hooks 609 comprises, connected to the cylindrical guide surface 609.1, a free end 609.2 extending beyond guide surface 609.1 in radial direction, which in the mounting position of the base corner piece 601 extends the rim portion for producing the releasable latch of the base corner piece to the frame profile. In the embodiment according to FIG. 7c, bayonet joint 608 is positively joined with the free end threaded seat 601, for example, welded thereto.

Figure 8:
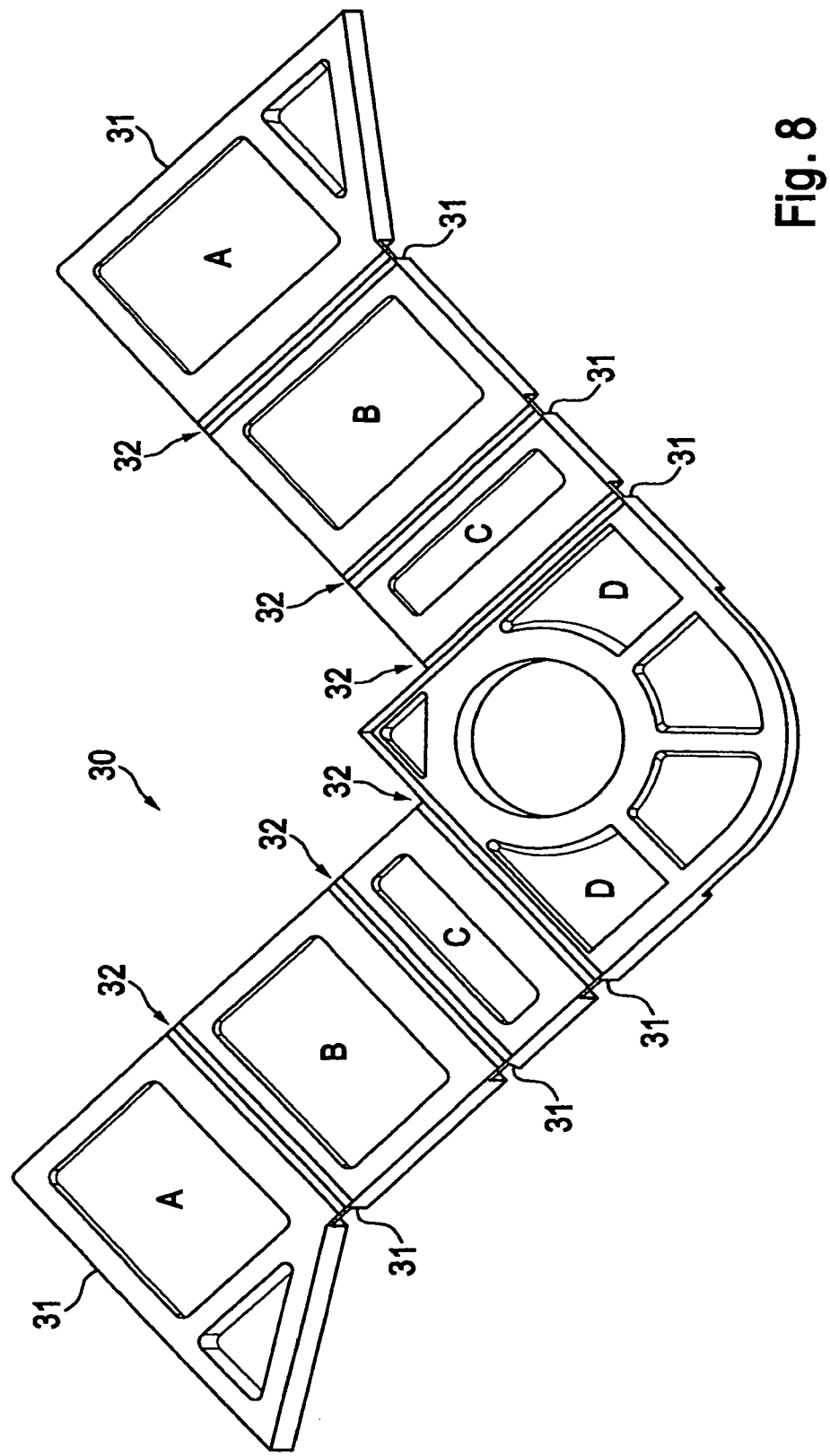
FIG. 8 a turning protection element.

FIG. 8 shows an exemplary embodiment of a turning protection element 30. It is formed as a separate component and can optionally be latched in the corner region of the base corner piece according to the invention. In a latched state, supporting surfaces 31 form abutment surfaces for a first and a second one of two inner sides of a frame profile perpendicular to each other. With the aid of the turning protection element, the frame profile can be pre-positioned on the base corner piece in a way that it may be screwed to the base corner piece more easily. Turning protection element 30 comprises two legs orthogonal to each other, where the length of the legs and accordingly the position of the supporting surface 31 of the free end of the legs may be varied optionally and accordingly be adjusted to a kind and nature of a relevant frame profile. Preferably, the legs of the turning protection element 30 comprise, optionally along the predetermined breaking points 32, an indication which, for example, gives an indication A, B, C, D to the kind of frame profile for which a relevant cutting of the turning protection element is appropriate. The turning protection element is preferably made of plastic material, wherein the predetermined breaking points are formed by V-shaped material tapering.

The features disclosed in the foregoing description, in the claims and/or in the accompanying drawings may, both separately and in any combination thereof, be material for realising the invention in diverse forms thereof.

PARTIAL REFERENCE NUMERAL LIST 1 base corner piece
2 supporting portion
3.1, 3.2 sides of the first set of abutment sides perpendicular to each other
4.1, 4.2 sides of the first set of abutment sides perpendicular to each other
5 latch
6 guide pins
7 permanent magnet
8 bayonet joint
9 bayonet hook
9.1 guide surface
9.2 free end
10 threaded seat
11 clamping element
11.1 support element
12 hole
20 frame profile
21 outer side
22 inner side
23 bayonet hook receiver
24 lower end face of vertical frame profile
25 rain gutter
26 receptacle
27 system perforation
28 edge
29 bolt seat
30 turning protection element
31 supporting surface
32 predetermined breaking point

The invention claimed is:

1. A base corner piece for single-handed mounting on a frame profile of a switch cabinet, the frame profile built from vertical and horizontal profile sides, comprising:
 a supporting portion that can be screwed to a frame profile of the switch cabinet in a mounted position of the base corner piece,
 wherein the base corner piece has means for pre-mounting of the base corner piece on the frame profile in the mounted position, comprising means for spatial orientation of the base corner piece in relation to the frame profile and means for releasable latching of the base corner piece to the frame profile, and
 wherein the means for spatial orientation include a bayonet joint comprising a plurality of bayonet hooks, wherein the bayonet hooks are concentrically arranged around a threaded seat for screwing the supporting portion to the frame profile, and
 wherein the threaded seat forms said means for releasable latching the base corner piece to the frame profile, and
 wherein the threaded seat defines internal threads.

2. The base corner piece of claim 1, wherein the plurality of bayonet hooks are arranged on a common circular path, the bayonet hooks respectively comprising a cylindrical guide surface for form-fit abutment at a rim surface of a bayonet hook receiver of the frame profile and, adjoined thereto, a free end extending beyond the guide surface in radial direction.

3. The base corner piece of claim 2, wherein the threaded seat is a sleeve inserted into the base corner piece, the bayonet hooks being integral with the threaded seat at an end thereof which is associated with the supporting portion.

* * * * *